United States Patent
Lim et al.

(10) Patent No.: US 12,506,233 B2
(45) Date of Patent: Dec. 23, 2025

(54) BUTTON-TYPE SECONDARY BATTERY

(71) Applicant: LG ENERGY SOLUTION, LTD., Seoul (KR)

(72) Inventors: Jae Won Lim, Daejeon (KR); Yong Gon Lee, Daejeon (KR); Je Jun Lee, Daejeon (KR); Geon Woo Min, Daejeon (KR); Min Su Cho, Daejeon (KR); Min Gyu Kim, Daejeon (KR); Hak Kyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 735 days.

(21) Appl. No.: 17/792,123

(22) PCT Filed: Sep. 16, 2021

(86) PCT No.: PCT/KR2021/012727
§ 371 (c)(1),
(2) Date: Jul. 11, 2022

(87) PCT Pub. No.: WO2022/060136
PCT Pub. Date: Mar. 24, 2022

(65) Prior Publication Data
US 2023/0111952 A1 Apr. 13, 2023

(30) Foreign Application Priority Data

Sep. 18, 2020 (KR) .................. 10-2020-0120949
Feb. 16, 2021 (KR) .................. 10-2021-0020704
Sep. 16, 2021 (KR) .................. 10-2021-0123771

(51) Int. Cl.
*H01M 50/593* (2021.01)
*H01M 50/109* (2021.01)
(Continued)

(52) U.S. Cl.
CPC ....... *H01M 50/593* (2021.01); *H01M 50/109* (2021.01); *H01M 50/147* (2021.01);
(Continued)

(58) Field of Classification Search
CPC ............. H01M 50/593; H01M 50/186; H01M 50/586; H01M 50/109; H01M 50/181;
(Continued)

(56) References Cited

U.S. PATENT DOCUMENTS 9,564,654 B2 2/2017 Wang
2012/0100406 A1 4/2012 Gaugler
(Continued)

FOREIGN PATENT DOCUMENTS

CN 107768554 A 3/2018
CN 109065822 A 12/2018
(Continued)

OTHER PUBLICATIONS

Boyle et al., "Hermetic Seam Sealing Microelectronic Devices", Amada Miyachi America, Sep. 2019 [see attached NPL presentation] (Year: 2019).*
(Continued)

*Primary Examiner* — Jessie Walls-Murray
(74) *Attorney, Agent, or Firm* — Morgan, Lewis & Bockius LLP (57) ABSTRACT

A button-type secondary battery includes an electrode assembly having a first electrode with a first electrode tab and a second electrode with a second electrode tab; a can accommodating the electrode assembly and to which the first electrode tab is connected; a top cap coupled to an opening of the can and to which the second electrode tab is connected; and a first insulation member insulating the first electrode tab. The first electrode tab includes a first coupling surface coupled to the first electrode and a second coupling
(Continued)

surface extending from the first coupling surface and coupled to the can. The first insulation member includes a first insulator attached to an outer circumferential surface of the electrode assembly to cover the first coupling surface, and a second insulator horizontally extending from an upper end of the first insulator toward a top surface of the electrode assembly.

11 Claims, 7 Drawing Sheets

(51) Int. Cl.
*H01M 50/147* (2021.01)
*H01M 50/181* (2021.01)
*H01M 50/186* (2021.01)
*H01M 50/528* (2021.01)
*H01M 50/533* (2021.01)
*H01M 50/548* (2021.01)
*H01M 50/56* (2021.01)
*H01M 50/586* (2021.01)
*H01M 50/536* (2021.01)

(52) U.S. Cl.
CPC ....... *H01M 50/181* (2021.01); *H01M 50/186* (2021.01); *H01M 50/528* (2021.01); *H01M 50/533* (2021.01); *H01M 50/586* (2021.01); *H01M 50/536* (2021.01); *H01M 50/548* (2021.01); *H01M 50/56* (2021.01)

(58) Field of Classification Search
CPC ... H01M 50/536; H01M 50/548; H01M 50/56
See application file for complete search history.

(56) References Cited

U.S. PATENT DOCUMENTS

| | | | |
|---|---|---|---|
| 2014/0315061 A1* | 10/2014 | Wang | H01M 10/0587 429/94 |
| 2015/0171384 A1 | 6/2015 | Kim | |
| 2017/0187008 A1 | 6/2017 | Gaugler | |
| 2018/0013101 A1 | 1/2018 | Gaugler | |
| 2018/0097215 A1 | 4/2018 | Cho et al. | |
| 2020/0083497 A1* | 3/2020 | Sabrowsky | H01M 10/0427 |
| 2020/0099018 A1 | 3/2020 | Gaugler | |
| 2020/0176750 A1 | 6/2020 | Funami et al. | |
| 2020/0194736 A1 | 6/2020 | Gaugler | |
| 2020/0212373 A1 | 7/2020 | Gaugler | |
| 2020/0212374 A1 | 7/2020 | Gaugler | |
| 2020/0403210 A1* | 12/2020 | Tse | H01M 50/531 |
| 2021/0184298 A1 | 6/2021 | Gaugler | |
| 2021/0265686 A1 | 8/2021 | Gaugler | |
| 2021/0280835 A1 | 9/2021 | Peng et al. | |
| 2021/0328290 A1 | 10/2021 | Lee et al. | |
| 2021/0384482 A1 | 12/2021 | Deng | |
| 2021/0399369 A1 | 12/2021 | Gaugler | |
| 2021/0399370 A1 | 12/2021 | Gaugler | |
| 2022/0216544 A1* | 7/2022 | Lee | H01M 50/528 |
| 2022/0320567 A1* | 10/2022 | Lee | H01M 50/181 |
| 2023/0170593 A1* | 6/2023 | Ko | H01M 50/528 429/164 |
| 2023/0223668 A1* | 7/2023 | Kageyama | H01M 10/0587 429/164 |

FOREIGN PATENT DOCUMENTS

| | | |
|---|---|---|
| CN | 109065823 A | 12/2018 |
| CN | 109860498 A | 6/2019 |
| CN | 209029466 U | 6/2019 |
| CN | 210156500 U | 3/2020 |
| CN | 210224213 U | 3/2020 |
| CN | 111082156 A | 4/2020 |
| CN | 210379131 U | 4/2020 |
| CN | 111129388 A | 5/2020 |
| CN | 210576261 U | 5/2020 |
| CN | 111370636 A | 7/2020 |
| CN | 111446386 A | 7/2020 |
| CN | 211182396 U | 8/2020 |
| CN | 211208486 U | 8/2020 |
| CN | 211578851 U | 9/2020 |
| CN | 211605266 U | 9/2020 |
| CN | 211789227 U | 10/2020 |
| CN | 212011032 U | 11/2020 |
| CN | 112290131 A | 1/2021 |
| JP | 3230968 U | 3/2021 |
| KR | 10-2012-0036970 A | 4/2012 |
| KR | 10-2017-0117653 A | 10/2017 |
| KR | 10-2018-0036086 A | 4/2018 |
| KR | 10-2020-0007559 A | 1/2020 |
| KR | 10-2020-0007562 A | 1/2020 |
| KR | 10-2020-0020173 A | 2/2020 |
| KR | 10-2020-0020619 A | 2/2020 |

OTHER PUBLICATIONS

Office Action issued Sep. 23, 2023 for corresponding Chinese Patent Application No. 202180008061.0 Note: CN 109065822 A, KR 2020-0020173 A, CN 111082156 A, CN 107768554 A, CN 111370636 A were cited in a prior IDS.
Extended European Search Report dated May 13, 2024 issued in European Patent Application No. 21869758.9.
International Search Report (with partial translation) and Written Opinion dated Jan. 4, 2022, for corresponding International Patent Application No. PCT/KR2021/012727.

* cited by examiner

BUTTON-TYPE SECONDARY BATTERY

TECHNICAL FIELD

Cross-Reference to Related Application

The present application claims the benefit of the priority of Korean Patent Application Nos. 10-2020-0120949, filed on Sep. 18, 2020, 10-2021-0020704, filed on Feb. 16, 2021, and 10-2021-0123771, filed on Sep. 16, 2021, which are hereby incorporated by reference in their entirety.

The present invention relates to a button-type secondary battery that increases in insulation of an electrode tab to prevent short circuit from occurring.

Background Art

In general, secondary batteries refer to chargeable and dischargeable, unlike primary batteries that are not chargeable. The secondary batteries are being widely used for mobile phones, notebook computers, and camcorders, electric vehicles, and the like.

The secondary battery comprises a button-type secondary battery having a high energy density, a high output, and a long lifespan. The button-type secondary battery comprises an electrode assembly, a can having an accommodation groove accommodating the electrode assembly, a top cap coupled to the can to finish the accommodation groove, and a gasket sealing a gap between the can and the top cap.

Also, the electrode assembly has a structure in which a first electrode and a second electrode are sequentially stacked with a separator therebetween. Here, the first electrode is provided with a first electrode tab connected to the can, and the second electrode is provided with a second electrode tab connected to the top cap.

An insulating tape having insulation is attached to the first electrode tab and the second electrode tab coupled to the electrode assembly.

However, the insulating tape according to the related art has a problem in that, when the electrode assembly is pressed and deformed, the first electrode tab or the second electrode tab is exposed outside the insulating tape, resulting in short circuit.

DISCLOSURE OF THE INVENTION

Technical Problem

The present invention is invented to solve the above problems, and an object of the present invention is to provide a button-type secondary battery, in which an insulation member that insulates an electrode tab coupled to an electrode assembly is supplemented to prevent the electrode tab from being exposed outside the insulation member even though the electrode assembly is deformed, to prevent short circuit from occurring, thereby improving safety.

Technical Solution

A button-type secondary battery according to the present invention for achieving the above object comprises: an electrode assembly comprising a first electrode provided with a first electrode tab and a second electrode provided with a second electrode tab; a can which accommodates the electrode assembly and to which the first electrode tab is connected; a top cap which is coupled to an opening of the can and to which the second electrode tab is connected; and a first insulation part provided with a first-a insulation member configured to insulate the first electrode tab connected to the first electrode, wherein the first electrode tab comprises a first-a coupling surface coupled to the first electrode of the electrode assembly and a first-b coupling surface extending from the first-a coupling surface between a bottom surface of the electrode assembly and a bottom surface of the can and coupled to the can, and the first-a insulation member comprises a first-a insulator attached to an outer circumferential surface of the electrode assembly to cover the first-a coupling surface, wherein both ends of the first-a insulation member are attached to extend up to upper and lower ends of the outer circumferential surface of the electrode assembly and a first-b insulator horizontally extending from an upper end of the first-a insulator toward a top surface of the electrode assembly.

The first insulation part may further comprise a first-b insulation member attached to the bottom surface of the can to cover the first-b coupling surface.

Corresponding ends of the first-a insulation member and the first-b insulation member may be disposed in a state of partially overlapping each other to insulate a portion of the first electrode tab disposed between the first-a insulation member and the first-b insulation member.

The first-b insulation member may be provided to be attached to the entire bottom surface of the can.

An insulation plate configured to insulate the electrode assembly and the top cap from each other may be provided between the electrode assembly and the top cap.

An end of the first-b insulator extending to the top surface of the electrode assembly may be attached to a top surface of the insulation plate.

The second electrode tab may comprise a second-a coupling surface coupled to the second electrode of the electrode assembly and a second-b coupling surface extending from the second-a coupling surface between the top surface of the electrode assembly and the top cap and coupled to the top cap, wherein the button-type secondary battery may comprise a second insulation part attached to the outer circumferential surface of the electrode assembly to cover the second-a coupling surface.

The second insulation part may comprise a second-a insulator attached to the outer circumferential surface of the electrode assembly, wherein both ends of the second-a insulator may be attached to extend up to the upper and lower ends of the outer circumferential surface of the electrode assembly, and a second-b insulator extending from a lower end of the second-a insulator to the bottom surface of the electrode assembly.

The second insulation part may comprise a second-c insulator horizontally extending from an upper end of the second-a insulator to the top surface of the electrode assembly.

An insulation plate may be provided between the electrode assembly and the top cap, and an end of the second-c insulator may be attached to the insulation plate.

The can may comprise a bottom surface, on which the electrode assembly is disposed, and a wall surface formed along an edge of the bottom surface to form an electrode assembly accommodation space, the top cap may comprise a cover surface configured to finish an accommodation space of the can and a coupling surface formed along an edge of the cover surface and coupled to the wall surface, and a gasket configured to seal a gap between the can and the top cap and insulate the can and the top cap from each other may be provided between the can and the top cap.

The can may comprise a bottom surface, on which the electrode assembly is disposed, and a wall surface formed along an edge of the bottom surface to form an electrode assembly accommodation space, the top cap may comprise a top plate which is coupled to the opening of the can and in which an insertion hole is formed, and an electrode terminal inserted into the insertion hole and connected to the second electrode tab, and a gasket configured to seal a gap between the top plate and the electrode terminal and insulate the top plate and the electrode terminal from each other may be provided between the top plate and the electrode terminal.

An outer circumferential side of the top plate and an inner circumferential side of an upper end of the can may be welded to be coupled so that the top plate and the can are coupled to be sealed.

The welding may comprise seam welding.

Advantageous Effects

The button-type secondary battery according to the present invention may comprise the electrode assembly, the can, the top cap, the gasket, the first electrode tab provided with the first-a coupling surface and the first-b coupling surface, and the first insulation part provided with the first-a insulation member, wherein the first-a insulation member may comprise the first-a insulator and the first-b insulator.

That is, the first-a insulator may be attached to the outer circumferential surface of the electrode assembly so that the first-a coupling surface is covered. Here, both the ends may be attached to extend to the upper end and the lower end of the outer circumferential surface of the electrode assembly, and the first-b insulator may extend horizontally from the upper end of the first-a insulator toward the top surface of the electrode assembly. Therefore, even if the deformation occurs in the electrode assembly, the first electrode tab may be prevented from being exposed outside the first-a insulation member to prevent the short circuit from occurring, thereby improving the safety.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
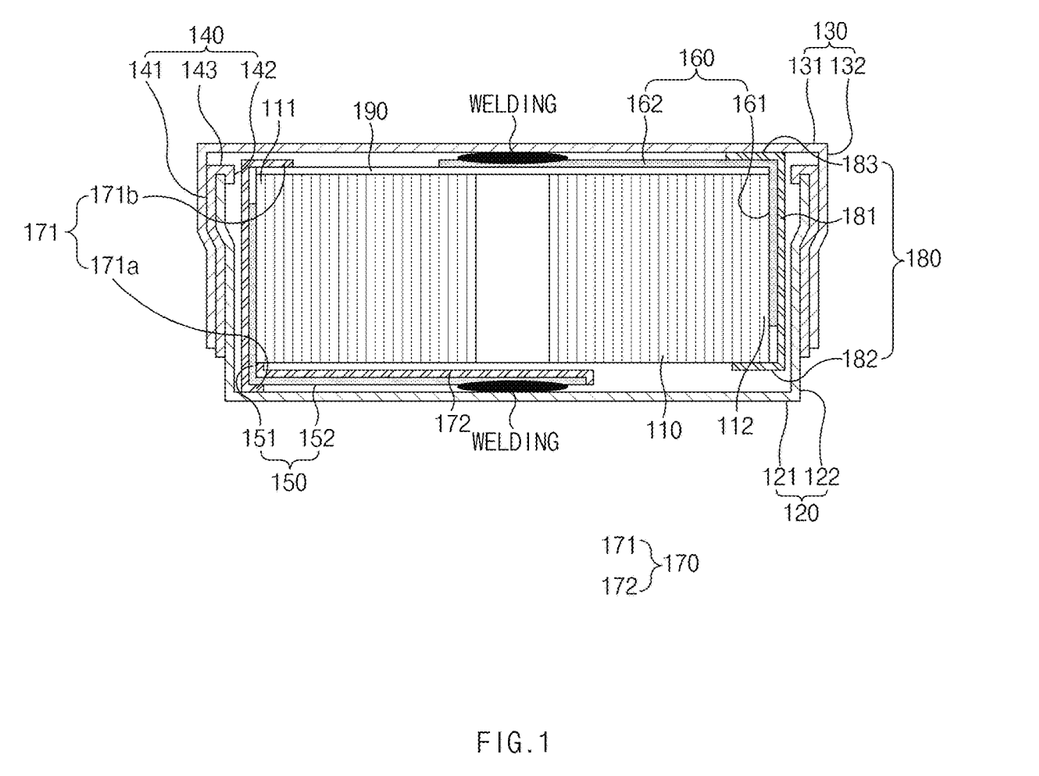
FIG. 1 is a cross-sectional view of a button-type secondary battery according to a first embodiment of the present invention.
Figure 2:
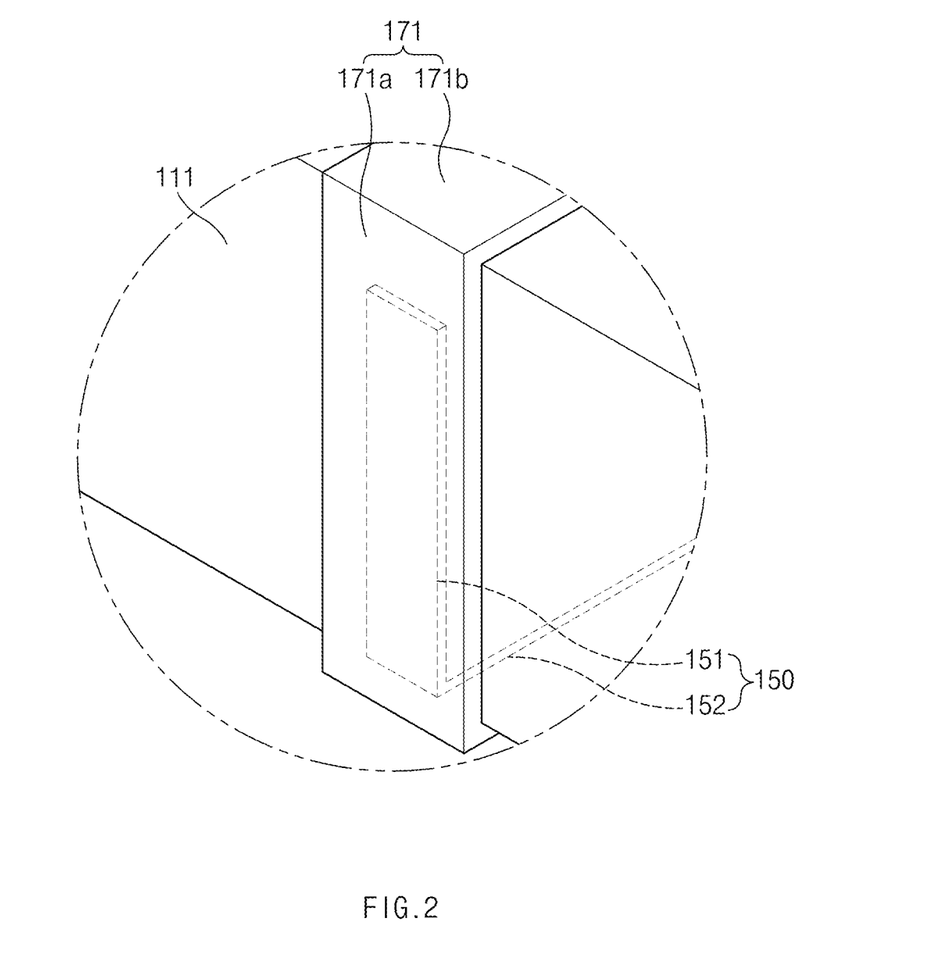
FIG. 2 is a perspective view illustrating a first-a insulator of the button-type secondary battery according to the first embodiment of the present invention.
Figure 3:
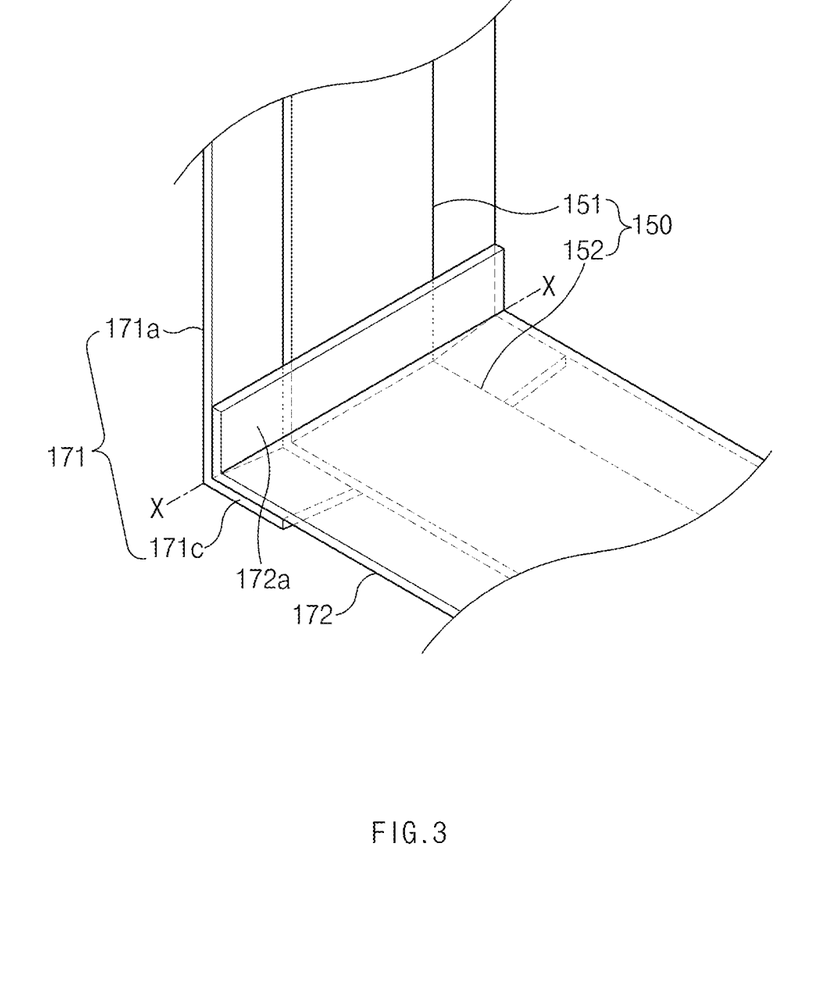
FIG. 3 is a perspective view illustrating a first-b insulator of the button-type secondary battery according to the first embodiment of the present invention.
Figure 4:
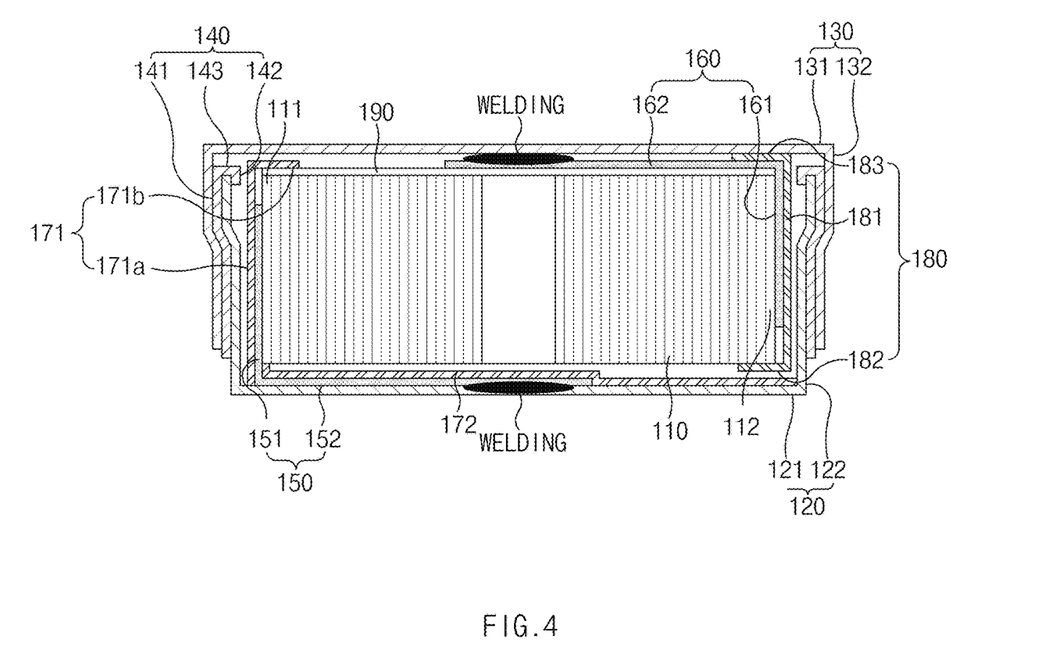
FIG. 4 is a perspective view of a button-type secondary battery according to a second embodiment of the present invention.

Button-Type Secondary Battery According to First Embodiment of the Present Invention As illustrated in FIGS. 1 to 3, a button-type secondary battery 100 according to a first embodiment of the present invention comprises an electrode assembly 110 comprising a first electrode 111 provided with a first electrode tab 150 and a second electrode 112 provided with a second electrode tab 160, a can 120 accommodating the electrode assembly 110, a top cap 130 coupled to an opening of the can 120, a gasket 140 insulating the can 120 from the top cap 130, a first electrode tab 150 connecting a first electrode of the electrode assembly 110 to the can 120, a second electrode tab 160 connecting a second electrode of the electrode assembly 110 to the top cap 130, a first insulation part 170 insulating the first electrode tab coupled to the first electrode, a second insulation part 180 insulating the second electrode tab coupled to the second electrode, and an insulation plate 190 insulating the electrode assembly 110 and the top cap 130 from each other.

Electrode Assembly

The electrode assembly 110 has a structure in which the first electrode and the second electrode are alternately stacked with a separator therebetween and which is wound in a jelly-roll shape. Here, a distal end of the first electrode 111 and a distal end of the second electrode 112 are disposed on the outermost sides of the electrode assembly 110, respectively. In addition, the first electrode tab 150 is connected to a distal end of the first electrode 111, and the second electrode tab 160 is connected to a distal end of the second electrode 112.

The first electrode 111 is a negative electrode, and the second electrode is a positive electrode. Of course, the first electrode tab is a negative electrode tab, and the second electrode tab is a positive electrode tab.

Can

The can 120 has a structure that forms an accommodation space accommodating the electrode assembly and comprises a bottom surface 121, on which the electrode assembly 110 is disposed, and a wall surface 122 formed along an edge of the bottom surface 121 to form an electrode assembly accommodation space.

Top Cap

The top cap 130 is coupled to an opening of the can to finish the accommodation space of the can and comprises a cover surface 131 disposed on the opening of the can 120 to finish the accommodation space of the can 120 and a coupling surface 132 formed along an edge of the cover surface 131 and coupled to the wall surface 122.

That is, the can and the top cap are coupled to each other in a compression manner.

Gasket

The gasket 140 is provided at a coupled portion of the can and the top cap to seal a gap between the can and the top cap and comprises an outer gasket 141 provided between the wall surface 122 of the can 120 and the coupling surface 132 of the top cap 130, an inner gasket 142 that is in close contact with the inside of the wall surface 122, and a connection gasket 143 connecting the outer gasket 141 to the inner gasket 142.

First Electrode Tab

The first electrode tab 150 is configured to connect the first electrode of the electrode assembly to the can and comprises a first-a coupling surface 151 coupled to a distal end of the first electrode 111 disposed at the outermost side of the electrode assembly 110 and a first-b coupling surface 152 extending from the first-a coupling surface 151 between a bottom surface of the electrode assembly 110 and the bottom surface 121 of the can 120 and coupled to the bottom surface 121 of the can 120.

Second Electrode Tab

The second electrode tab 160 is configured to connect the second electrode of the electrode assembly to the top cap and comprises a second-a coupling surface 161 coupled to a distal end of the first electrode 112 disposed at the outermost side of the electrode assembly 110 and a second-b coupling surface 162 extending from the second-a coupling surface 161 between a top surface of the electrode assembly 110 and the cover surface 131 of the top cap 130 and coupled to the cover surface 131 of the top cap 130.

First Insulation Part

The first insulation part 170 is configured to insulate the first electrode tab and insulates the first electrode tab 170 connecting the first electrode 111 disposed at the outermost side of the electrode assembly 110 to the can 120.

Second Insulation Part

The second insulation part 180 is configured to insulate the second electrode tab and insulates the second electrode tab 160 connecting the second electrode 112 disposed at the outermost side of the electrode assembly 110 to the top cap 130.

Insulation Plate

The insulation plate 190 is configured to insulate the electrode assembly from the top cap, is made of a material having insulation, and is provided between a top surface of the electrode assembly 110 and the cover surface 131 of the top cap 130 to insulate the electrode and the top cap 130 from each other.

The button-type secondary battery has a structure in which it is difficult to sufficiently secure upper and lower spaces of the electrode assembly because a diameter thereof is greater than a height thereof. In the button-type secondary battery having such a structure, when pressed in a height direction by an external impact or pressure, the electrode assembly 110 is deformed into a flat shape, and thus, the first electrode tab 150 coupled to the outermost side of the electrode assembly 110 may be exposed to the outside of the first insulation part 170, and the second electrode 160 may be exposed to the outside of the second insulation part 180. That is, the first electrode tab 150 may be exposed to the outside through a bonded portion of the first insulation part 170 and the electrode assembly 110, and the second electrode tab 160 may be exposed to the outside through a bonded portion of the second insulation part 180 and the electrode assembly 110. Thus, the button-type secondary battery has a risk of internal short circuit when pressed to be deformed. (It means a problem that occurs when the first insulation part and the second insulation part are formed differently from the form according to the present invention described below).

In order to solve this problem, the button-type secondary battery 100 according to the first embodiment of the present invention supplements the structures of the first insulation part 170 and the second insulation part 180 to prevent the first and second electrode tabs 150 and 160 from being exposed to the outside of the first and second insulation parts 170 and 180 even though the electrode assembly 110 is pressed to be deformed, thereby removing the risk of the short circuit inside the button-type secondary battery.

That is, the first insulation part 170 comprises a first-a insulation member 171 insulating the first-a coupling surface 151 of the first electrode tab 150 coupled to the first electrode 111 disposed at the outermost side of the electrode assembly 110. The first-a insulation member 171 may be attached to an outer circumferential surface of the electrode assembly 110 to completely cover the first-a coupling surface 151 to effectively insulate the entire first-a coupling surface 151 and also prevent the first-a coupling surface 151 from being exposed to the outside of the first-a insulation member 171 even though the electrode assembly 110 is deformed.

Here, the first-a insulation member 171 comprises a first-a insulator 171a attached to extend so that both ends correspond to upper and lower ends of an outer circumferential surface of the electrode assembly 110 when viewed in FIG. 1 and a first-b horizontally extending from an upper end of the first-a insulator 171a toward the top surface of the electrode assembly 110, which is perpendicular to the first-a insulator 171a. Thus, the first-a insulation member 171 disposed on upper and lower ends of the first electrode tab 150 may increase in area, and thus, even though the electrode assembly is pressed to be flat, the first electrode tab 150 may be prevented from being exposed to the outside through the upper and lower ends of the first-a insulation member.

Particularly, a gap between the upper end of the first-a insulator 171a and the upper end of the electrode assembly 110 may be finished through the first-b insulator 171b. That is, referring to FIG. 2, the first-a insulator 171a and the first-b insulator 171b may be bent in a state of being connected to each other to finish the bonded portion between the upper end of the electrode assembly 110 and the upper end of the first-a insulator 171a, thereby preventing the first electrode tab 150 from being significantly exposed to the outside between the upper end of the first-a insulation member 171 and the upper end of the electrode assembly 110.

The first insulation part 170 further comprises a first-b insulation member 172 that insulates the first-b coupling surface 152. The first-b insulation member 172 is attached to the bottom surface 121 of the can 120 so that the first-b coupling surface 152 is completely covered. Particularly, the first-b insulation member 172 is attached to the bottom surface 121 in a state in which a left end extends to a boundary point between the first-a coupling surface 151 and the first-b coupling surface 152 when viewed in FIG. 1. Thus, even when deformation occurs in a radial and longitudinal direction of the electrode assembly 110, it is possible to prevent the first-b coupling surface 152 from being significantly exposed to the outside of the first-b insulation member 172.

The end of the first-b insulator 171b extending to the top surface of the electrode assembly 110 is attached to a top surface of the insulation plate 190. Thus, it is possible to increase in adhesive force of the first-b insulator 171b, and as the first-b insulator 171b holds one end of the insulation plate 190, an increase in fixing force and a moving phenomenon of the insulation plate 190 may be greatly prevented.

The first-a insulator, the first-b insulator, and the first-c insulator are integrally formed, and the first insulation member and the first-d insulator are integrally formed.

The second insulation part 180 comprises a second-a insulator 181, which is attached to the outer circumferential surface of the electrode assembly 110 so that the second-a coupling surface 161 is covered and has both ends attached to extend so as to match the upper and lower ends of the outer circumferential surface of the electrode assembly 110, and a second-b insulator 182 attached to extend from a lower end of the second-a insulator 181 to the bottom surface of the electrode assembly 110. Thus, an area of the second insulation part 180 disposed on the upper and lower portions of the second-a coupling surface 161 coupled to the electrode assembly 110 may increase, and as a result, even though the electrode assembly 110 is deformed, the second electrode tab 160 may be significantly prevented from being exposed to the outside. Particularly, the gap between the lower end of the second-a insulator 181 and the lower end of the electrode assembly may be effectively finished through the second-b insulator 182, and as a result, the second electrode tab 160 may be significantly prevented to the outside between the second-a insulator 181 and the electrode assembly.

The second insulation part 180 may comprise a second-c insulator 183 horizontally extending from an upper end of the second-a insulator 181 to the top surface of the electrode assembly 110, and thus, the second-c insulator 183 may effectively finish a gap between the upper end of the second-a insulator 181 and the upper end of the electrode assembly to significantly prevent the second electrode tab 160 from being exposed to the outside between the second-a insulator 181 and the electrode assembly.

An end of the second-c insulator 183 extending to the top surface of the electrode assembly 110 may be attached to the insulation plate 190 to increase in adhesive force of the end of the second-c insulator 183. Thus, the second-c insulator 183 may hold the other end of the insulation plate 190 to significantly prevent the increase in fixing force and the moving phenomenon of the insulation plate 190.

The second-a insulator 181, the second-b insulator 182, and the second-c insulator 183 are integrally formed.

The corresponding ends of the first-a insulation member 171 and the first-b insulation member 172 (a lower end of the first-a insulation member and a right end of the first-b insulation member when viewed in FIG. 1) are disposed to partially overlap each other, thereby effectively insulating a portion (i.e., a boundary line connecting the first-a coupling surface to the first-b coupling surface) of the first electrode tab 150 disposed between the first-a insulation member 171 and the first-b insulation member 172. That is, referring to FIG. 3, the first-a insulation member 171 and the first-b insulation member 172 may surround the boundary line x between the first-a coupling surface 151 and the first-b coupling surface 152 to significantly prevent the boundary point between the first-a insulation member 171 and the first-b insulation member 172 from being exposed to the outside.

For example, the first-a insulation member 171 comprises a first-c insulator 171c horizontally extending from the lower end of the first-a insulator to the bottom surface of the first-b coupling surface 152 and attached to the first-b insulation member 172. Also, the first-b insulation member 172 comprises a first-d insulator 172a vertically extending from a left end to the first-a coupling surface 151 when viewed in FIG. 1 and attached to the first-a insulation member 171. Thus, the first-c insulator 171c and the first-d insulator 172a may be provided to stably insulate and protect the first-a coupling surface 151 and the first-b coupling surface 152.

Therefore, the button-type secondary battery 100 according to the first embodiment of the present invention may comprise the first insulation part 170 and the second insulation part 180 to significantly prevent the first and second electrode tabs from being exposed to the outside even though the electrode assembly is deformed and also significantly prevent the internal short circuit from occurring, thereby improving the safety.

Hereinafter, in descriptions of another embodiment of the present invention, constituents having the same configuration and function as the above-mentioned embodiment have been given the same reference numeral in the drawings, and thus duplicated description will be omitted.

Figure 5:
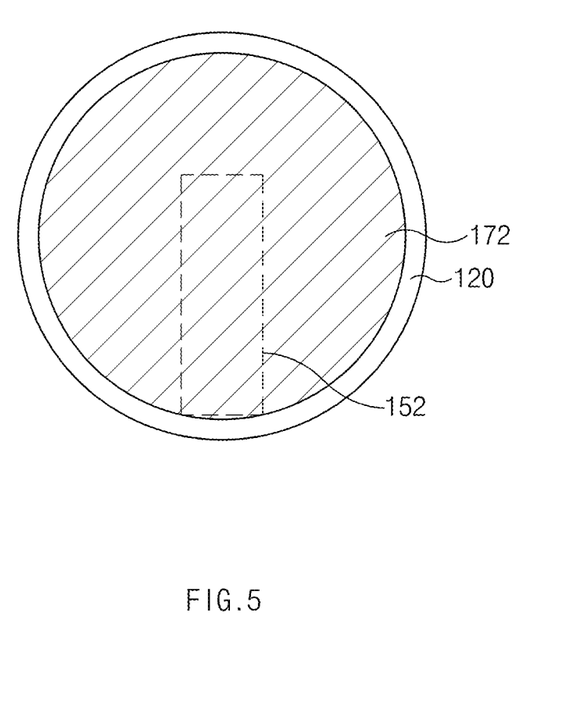
FIG. 5 is a plan view of a button-type secondary battery according to a third embodiment of the present invention.

Button-Type Secondary Battery According to Second Embodiment of the Present Invention As illustrated in FIG. 5, a button-type secondary battery 100 according to a second embodiment of the present invention comprises a first-b insulation member 172 attached to a first-b coupling surface 152 of a first electrode tab 150.

Here, the first-b insulation member 172 is attached to a bottom surface 121 in a state in which a right end of the first-b insulation member 172 extends up to a boundary point between a bottom surface 121 and a wall surface 122. Thus, even though the electrode assembly 110 is deformed in a radial and longitudinal direction of the electrode assembly, the first-b coupling surface 152 may be significantly prevented from being exposed to the outside of the first-b insulation member 172. That is, costs may be reduced by minimizing consumption of the first-b insulation member 172, and the electrode assembly 110 and the can 120 may be effectively insulated.

Button-Type Secondary Battery According to Third Embodiment of the Present Invention As illustrated in FIG. 5, a button-type secondary battery 100 according to a third embodiment of the present invention comprises a first-b insulation member 172 attached to a first-b coupling surface 152 of a first electrode tab 150.

Here, the first-b insulation member 172 is attached to an entire bottom surface 121 of the can 120. Thus, it is possible to effectively insulate the electrode assembly 110 from the can 120 without installing a separate insulation plate between the can 120 and the electrode assembly, thereby improving safety.

Figure 6:
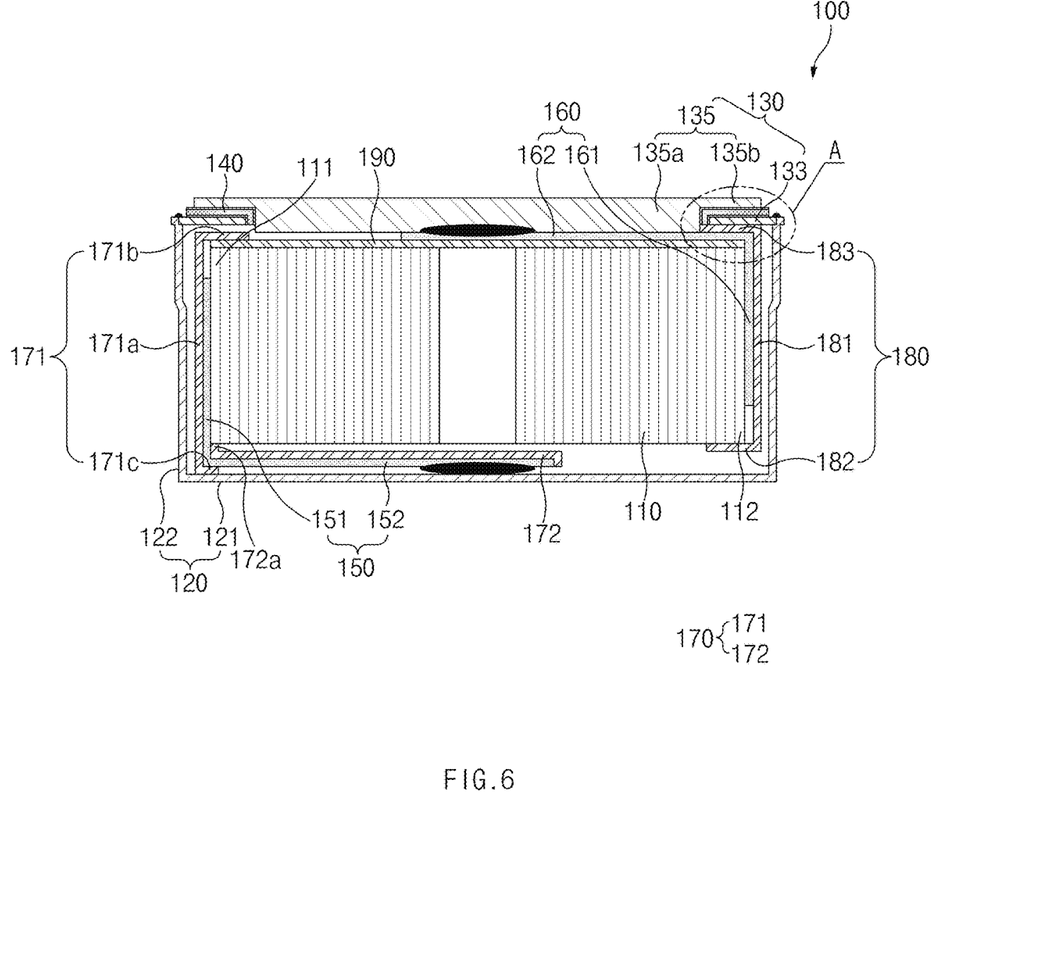
FIG. 6 is a cross-sectional view of a button-type secondary battery according to a fourth embodiment of the present invention.
Figure 7:
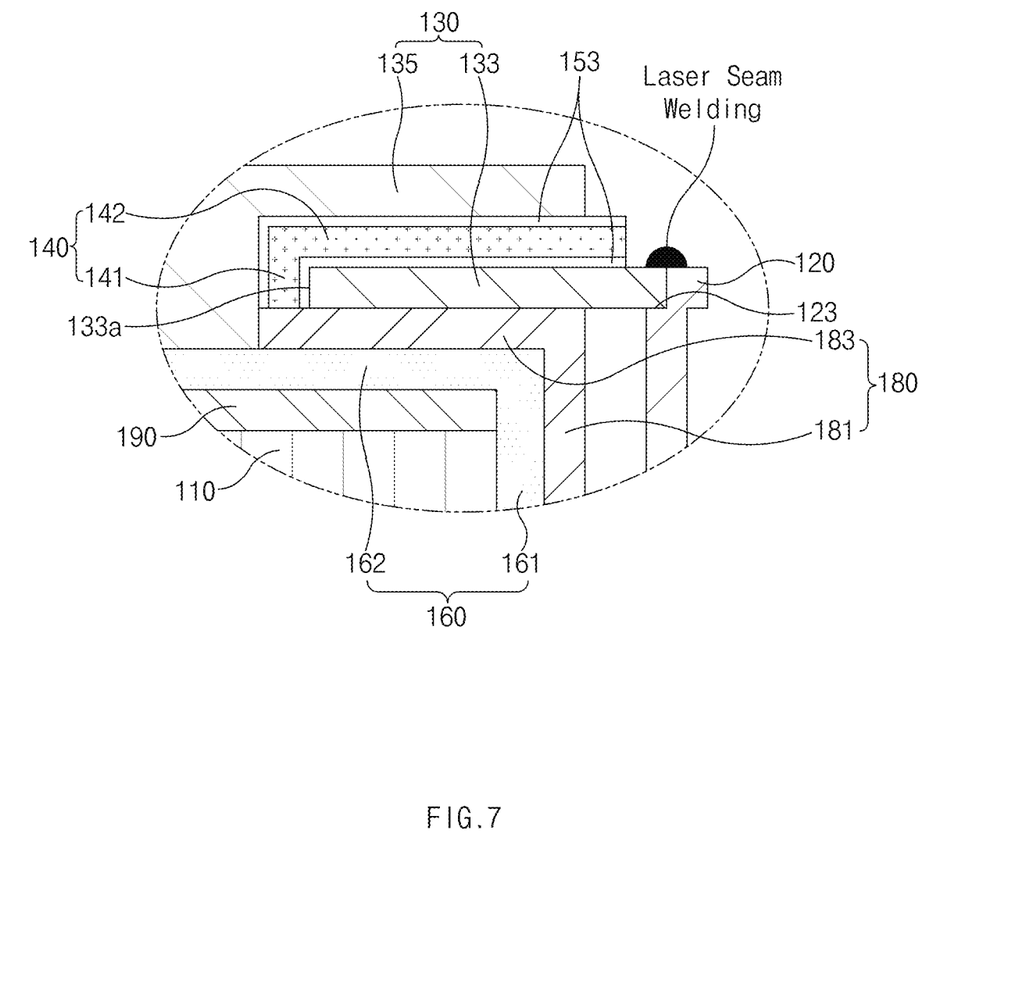
FIG. 7 is an enlarged view of a portion A illustrated in FIG. 6.

Button-Type Secondary Battery According to Fourth Embodiment of the Present Invention As illustrated in FIGS. 6 and 7, a button-type secondary battery 100 according to a fourth embodiment of the present invention comprises an electrode assembly 110 comprising an electrode assembly 110 comprising a first electrode 111 provided with a first electrode tab 150 and a second electrode 112 provided with a second electrode tab 160, a can 120 accommodating the electrode assembly 110 and connected to the first electrode tab 150, a top cap 130 coupled to an opening of the can 120 and connected to the second electrode tab 160, a first insulation part 170 insulating the first electrode tab 150 connected to the first electrode 111, a second insulation part 180 insulating a second electrode tab 160 connected to the second electrode 112, and an insulation plate 190 insulating the electrode assembly from the top cap 130.

The electrode assembly, the first electrode tab, the second electrode tab, the first insulation part, the second insulation part, and the insulation plate have the same configuration and function as the electrode assembly, the can, the first electrode tab, the second electrode tab, the first insulation part, the second insulation part, and the insulation plate, and thus, their duplicated description will be omitted.

The can 120 comprises a bottom surface 121, on which the electrode assembly 110 is disposed, and a wall surface 122 formed along an edge of the bottom surface 121 to form an accommodation space accommodating the electrode assembly 110.

The top cap 130 comprises a top plate 133 coupled to an opening of the can 120 and having an insertion hole 133a and an electrode terminal 135 inserted into the insertion hole 133a and connected to the second electrode tab 160.

A gasket 140 sealing a gap between the top plate 133 and the electrode terminal 135 and insulating the top plate 133 from the electrode terminal 135 is provided between the top plate 133 and the electrode terminal 135.

The electrode terminal 135 is connected to the second electrode tab of the electrode assembly and comprises a connection part 135a inserted into the insertion hole 131a of the top plate 133 and coupled to the second electrode tab 160 through welding and a support part 135b supported on a top surface of the tap plate 133.

The gasket 140 is configured to insulate the electrode terminal and the top plate and seal a gap between the electrode terminal and the top plate. That is, the gasket 140 comprises a vertical gasket 141 disposed in the insertion hole 131a between an inner circumferential side of the top plate 133 and an outer circumferential side of the electrode terminal 135 and a horizontal gasket 142 disposed between a top surface of the top plate 133 and a bottom surface of the electrode terminal 135.

Here, the gasket 140 may be made of a material having insulation and sealing properties.

An adhesive means 153 bonding the gasket 140 to the top plate 133 or the electrode terminal 135 may be further provided.

As a first example, the adhesive means 153 may apply an adhesive having adhesive force to the gasket 140 so that the gasket 140 and the top plate 133 or the gasket 140 and the electrode terminal 135 adhere to each other.

As a second example, when heat is applied to the top plate, a portion of the gasket is melted to thermally fuse the gasket 140 and the top plate 133 or the gasket 1440 and the electrode terminal 135.

The outer circumferential side of the top plate 133 and the inner circumferential side of the upper end of the can 120 are welded so that the top plate 133 and the can 120 are coupled to be sealed. That is, the can 120 and the top cap 130 are coupled to each other in a welding manner.

Particularly, the welding of the top plate 133 and the can 120 may be seam welding. Preferably, the welding may be laser seam welding. The seam welding may be continuously performed through spot welding. That is, the seam welding is a method for performing the welding by rotating the electrode while using the electrode having a rotating roller shape and supplying welding current. Such the seam welding is used for a continuous operation for a container and a long pipe that require sealing. Particularly, when the roller for the seam welding is rotated, large supply current is required because a portion of the supply current flows to the welded portion first, and a portion of the supply current flows between roller electrodes. As described above, the can and the top plate may be welded through the seam welding so that the can and the top plate is coupled to be sealed.

The top plate 133 is seated on a seating protrusion 123 formed on an inner wall of the can 120 to improve coupling between the top plate 133 and the can 120.

Therefore, in the button-type secondary battery 100 according to the fourth embodiment of the present invention, the top plate 133 and the can 120 may be coupled to each other in the welding manner to increase in coupling force between the top plate 133 and the can 120, and thus, the accommodation space of the can 120 may be stably seated.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Button-type secondary battery
110: Electrode assembly
111: First electrode
112: Second electrode
120: Can
121: Bottom surface
122: Wall surface
130: Top cap
131: Cover surface
132: Coupling surface
133: Top plate
133a: Insertion hole
135: Electrode terminal
140: Gasket
141: Outer gasket
142: Inner gasket
143: Connection gasket
150: First electrode tab
151: First-a coupling surface
152: First-b coupling surface
160: Second electrode tab
161: Second-a coupling surface
162: Second-b coupling surface
170: First insulation part
171: First-a insulation member
171a: First-a insulator
171b: First-b insulator
171c: First-c insulator
172: First-b insulation member
172a: First-d insulator
180: Second insulation part
181: Second-a insulator
182: Second-b insulator
183: Second-c insulator
190: Insulation plate

The invention claimed is:

1. A button-type secondary battery comprising:
an electrode assembly comprising a first electrode with a first electrode tab and a second electrode with a second electrode tab;
a can accommodating the electrode assembly and to which the first electrode tab is connected;
a top cap coupled to an opening of the can and to which the second electrode tab is connected;

a first insulation part with a first insulation member configured to insulate the first electrode tab connected to the first electrode;

a second insulation part attached to an outer circumferential surface of the electrode assembly, wherein;

the first electrode tab comprises a first coupling surface coupled to the first electrode of the electrode assembly and a second coupling surface extending from the first coupling surface between a bottom surface of the electrode assembly and a bottom surface of the can and coupled to the can;

the first insulation member comprises a first insulator attached to the outer circumferential surface of the electrode assembly to cover the first coupling surface, wherein both ends of the first insulation member are attached to extend up to upper and lower ends of the outer circumferential surface of the electrode assembly, and a second insulator horizontally extending from an upper end of the first insulator toward a top surface of the electrode assembly;

the second electrode tab comprises: a third coupling surface coupled to the second electrode of the electrode assembly; and a fourth coupling surface extending from the third coupling surface between the top surface of the electrode assembly and the top cap and coupled to the top cap;

the second insulation part comprises: a third insulator attached to the outer circumferential surface of the electrode assembly, wherein the third insulator covers the third coupling surface, wherein both ends of the third insulator are attached to extend up to the upper and lower ends of the outer circumferential surface of the electrode assembly; a fourth insulator extending from a lower end of the third insulator to the bottom surface of the electrode assembly; and a fifth insulator horizontally extending from an upper end of the third insulator to the top surface of the electrode assembly;

the third insulator is not disposed between the can and the top cap in a horizontal direction and is different from the first insulator;

the fourth insulator is spaced apart from the bottom surface of the can in a vertical direction, does not extend an entire length of the bottom surface of the electrode assembly in the horizontal direction, and is spaced apart from the second coupling surface in the horizontal direction;

the fourth insulator closes a gap between the lower end of the third insulator and the lower end of the electrode assembly; and the fifth insulator is disposed above the fourth coupling surface in the vertical direction.

2. The button-type secondary battery of claim 1, wherein the first insulation part further comprises a second insulation member attached to the bottom surface of the can to cover the second coupling surface.

3. The button-type secondary battery of claim 2, wherein corresponding ends of the first insulation member and the second insulation member are disposed in a state of partially overlapping each other to insulate a portion of the first electrode tab disposed between the first insulation member and the second insulation member.

4. The button-type secondary battery of claim 2, wherein the second insulation member is attached to an entire bottom surface of the can.

5. The button-type secondary battery of claim 1, wherein an insulation plate configured to insulate the electrode assembly and the top cap from each other is between the electrode assembly and the top cap.

6. The button-type secondary battery of claim 5, wherein an end of the second insulator extending to the top surface of the electrode assembly is attached to a top surface of the insulation plate.

7. The button-type secondary battery of claim 1, wherein an insulation plate is provided between the electrode assembly and the top cap, and an end of the fifth insulator is attached to the insulation plate.

8. The button-type secondary battery of claim 1, wherein the can comprises the bottom surface on which the electrode assembly is disposed, and a wall surface along an edge of the bottom surface of the can to form an electrode assembly accommodation space, wherein the top cap comprises a cover surface configured to finish an accommodation space of the can and a coupling surface along an edge of the cover surface and coupled to the wall surface, and wherein a gasket configured to seal a gap between the can and the top cap and to insulate the can and the top cap from each other is provided between the can and the top cap.

9. The button-type secondary battery of claim 1, wherein the can comprises the bottom surface on which the electrode assembly is disposed, and a wall surface along an edge of the bottom surface of the can to form an electrode assembly accommodation space, wherein the top cap comprises a top plate coupled to the opening of the can and having an insertion hole therein, and an electrode terminal inserted into the insertion hole and connected to the second electrode tab, and wherein a gasket configured to seal a gap between the top plate and the electrode terminal and to insulate the top plate and the electrode terminal from each other is provided between the top plate and the electrode terminal.

10. The button-type secondary battery of claim 9, wherein an outer circumferential side of the top plate and an inner circumferential side of an upper end of the can are welded to be coupled so that the top plate and the can are coupled to be sealed.

11. The button-type secondary battery of claim 10, wherein the welding comprises seam welding.

* * * * *